3,764,391
FUEL CELL AND ELECTRODE STRUCTURE
THEREFOR
Bernard Warszawski, Paris, Henri Vandenberghe, Vincennes, and Bernard Verger, Palaiseau, France, assignors to Societe Generale de Constructions Electriques et Mecanique (Alsthom), Paris, France
Filed Sept. 9, 1970, Ser. No. 70,636
Int. Cl. H01m 27/12
U.S. Cl. 136—86 D                                    25 Claims

ABSTRACT OF THE DISCLOSURE

An assembly of stacked electrodes, alternating with semipermeable diaphragms is built up, with the marginal portions of the electrodes and diaphragms formed with flow duct openings to direct electrolyte and reactants to flow lengthwise of the stack of electrodes and diaphragms and, by means of channels formed in the electrodes, to wash over the faces of the electrodes; the electrode face is embossed with projections arranged in a plurality of adjacent elementary groups, each in itself parallel to the marginal portions of the electrode, the projections themselves being formed in arrays of elongated ridges, peak points, or the like, which may be continuous or discontinuous, and which are inclined with respect to the marginal portions, the direction of inclination of adjacent groups being opposite towards each other so that the median flow direction of electrolyte and reactant washing over the face of the electrodes will be approximately perpendicular to the marginal portions from which the flow emanates.

---

Cross reference: U.S. Pats. 3,516,866; 3,518,122; U.S. Ser. No. 708,225 issued as U.S. Pat. No. 3,530,003; and application No. 708,338 now abandoned in favor of No. 123,110.

The present invention relates to fuel cells, and more particularly to an electrode structure for use in fuel cells of the type shown and described in U.S. Pats. 3,516,866, 3,518,122, and U.S. Pat. No. 3,530,003 and application No. 123,110, the disclosure of each of which is hereby incorporated by reference.

Fuel cells in which a reactant is dissolved or otherwise carried in an electrolyte have additionally been described and proposed in French Pats. 1,379,800, 1,399,765, 1,564,-864, and 1,604,897; the foregoing French and U.S. patents describe structures which provide compact fuel cells of substantial output. Briefly in general these structures are a stack of individual thin plates forming electrodes, preferably bipolar, and separated by alternate semi-permeable diaphragms. The electrodes are formed of non-porous sheet materials, embossed with projections. These electrodes, with the interposition of the diaphragm, are placed one against the other. The end electrodes then form collectors for electric current. The electrodes are held in frames, or are otherwise formed with openings in their marginal portions, as well as with ducts extending from the marginal portions to the faces of the electrodes to carry electrolyte fluid from a supply to the electrodes, to wash transversely of the battery across the face of the electrode and to be removed by other ducts formed opposite the supply duct in the marginal portions of the electrodes. Two hydraulic circuits are provided, one for an anodic and the other for a cathodic reactant in an electrolyte. The ducts, as well as the guide openings from the ducts to the faces of the electrodes thus provide for washing of the electrolyte, which is charged with a reactant, over the face of the electrode parallel to the median plane thereof.

Difficulty has been experienced in that the stacked electrodes will nest one within the other; it has previously been proposed, in order to prevent such nesting, that the projections of the electrodes are made as elongated parallel segments, and then to angularly displace these parallel segments, in two successive electrodes, with respect to each oher. An arrangement of this type is described, for example, in French Pat. No. 1,574,016. French Pat. No. 1,584,577 describes an electrode with an undulating, or corrugated surface which can be applied against an identical, adjacent electrode, but angularly displaced with respect thereto. Such an arrangement avoids all danger of nesting, or matching of depressions against projections, which might inhibit uniform fluid flow over the face of the electrode. Additionally, this electrode has the property that, when supplied by a carrier electrolyte in which a large quantity of a gaseous reactant is contained, a separation in two phases will result; the reactant and the electrolyte will pass over the face of the electrode in different layers which is particularly good with respect to the distribution of surface contact between the reactant and the electrode on the one hand, and between the electrolyte and the semi-permeable diaphragm on the other. This mode of fluid flow, in which reactant and electrolyte are separated in layers is provided by electrodes which may be termed "electrodes with slip-layer surfaces" since the reactant and electrolyte itself will form layers slipping with respect to each other.

The electrodes above referred to, and described in detail in the two above identified French applications avoid the difficulty of nesting of electrodes since the projections on one electrode, as elongated elements, can be offset angularly against the then matching depressions of the other electrode, so that the angles will extend in different direction. Difficulties have, however, been experienced with fluid flow of the electrolyte and reactant over the faces of the electrodes since the direction of fluid flow and the direction of the projections, or depressions, respectively, may be incompatible. Assuming that a rectangular electrode is to have fluid flow extending from the upper marginal portion to the lower one, it will necessarily follow that in some electrodes the projections, or depressions are substantially inclined with respect to these marginal portions of the electrodes which provides for poor fluid distribution over the face of the electrode. The electrodes are, therefore, not utilized to their full capacity.

It is an object of the present invention to provide a fuel cell having an electrode structure in which the aforementioned advantages are realized without its accompanying disadvantages.

Subject matter of the present invention: Briefly, bipolar electrodes are formed of thin sheets, stacked alternately with semi-permeable diaphragms to form a fuel cell. To improve fluid flow across the face of the electrodes, the depressions and projections, respectively, are so arranged that they will provide for an average fluid flow which is direct and transverse across the face of the electrodes. The projections, and depressions, respectively, are therefore formed in a plurality of elementary groups, each forming a parallel band, or track, the individual depressions and projections forming arrays which are inclined with respect to fluid flow; successive arrays in adjacent groups, however, have their direction of inclination extend in alternate opposed directions so that the median, or average fluid flow will be essentially directly from a fluid input to a fluid outlet. Preferably, the projections are formed as small ridges which may be continuous or discontinuous, straight or curved, and parallel with respect to each other; their angle of inclination with respect to the edges of the electrodes may extend, for example, to 45°.

Preferably, the electrodes are formed by an embossed sheet in which projections and depressions are laterally offset, or staggered, the projections on one face of the sheet forming a depression on the other; the electrodes may be made of metallic or semiconductive sheet material, or of plastic which is made conductive, for example by a conductive filler. Electrodes may have a catalyst applied to the surfaces thereof.

In a preferred form, the groups of projections form, within each other, a chevron pattern, the various elementary arrays forming parallel, straight lines symmetrically arranged with respect to an edge, or marginal portion of the electrode, between which the electrolyte and reactant washes over the face of the electrode. The angle of inclination itself may be of any magnitude, so long as it is greater than zero; in a preferred form, the angle is about 45°. Electrodes of the type proposed can be stacked, one against the other with an interposed diaphragm, but inverted by 180°; such inversion effectively inhibits nesting of projections of one electrode into the depression of an adjacent one, without, however, interfering with proper fluid flow.

The projections may be straight, or may be in the form of arcs of circles, or similar curves, so long as the direction of inclination, and the spacing between projections is so arranged that adjacent electrodes, turned one with respect to the other by, for example, 180° will not cause projections formed on one electrode to nest within depressions of an adjacent one applied against its face. One or more types of arrays of projections may be used within the same group, or different types of arrays may be used on one electrode formed of different groups. Each one of the groups, themselves, may have within a group projections extending at different angles.

As referred to in the present application, the terminology "marginal portions" and described in connection with plane edges, can be equally applied to circular electrodes; in that instance, the reference to marginal portions, and to parallel lines will then, of course, apply to parallel relationships wtih the tangent of the circular electrode, at any given point, and parallel relationships may then become concentric relationships, within the context of the specification.

The invention will be described by way of example with reference to the accompanying drawings, wherein.

Figure 1:
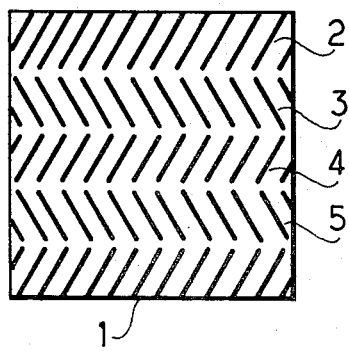
FIGS. 1 to 4 are schematic, plan representations, in greatly enlarged form, of elementary arrays of projections in straight form.

Embodiment of FIG. 1: Electrode 1 is formed with succesive arrays of projections, or depressions respectively in rows 2, 3, 4, 5, each one of the projections (or depressions, respectively) forming continuous straight segments.

Figure 2:
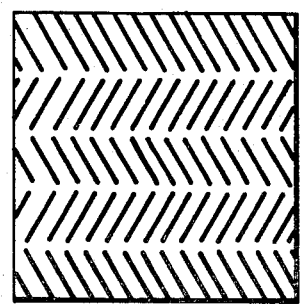

Embodiment of FIG. 2: Each one of the arrays is formed of five successive inclined projections, the direction of inclination being in opposite direction.

Figure 3:
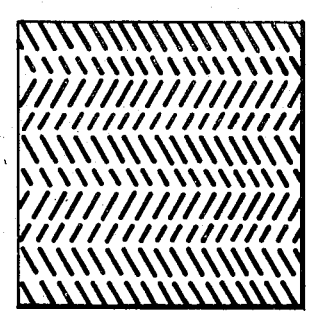

Embodiment of FIG. 3: The electrode is similar to that of FIG. 2, but the straight, rectilinear segments of each network are discontinuous, so that each rectilinear projection is broken up into two elementary segments. Of course, more than two elementary segments may be provided.

Figure 4:
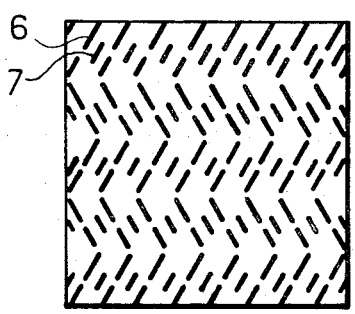

Embodiment of FIG. 4: The electrode projections 6 are broken up into two discontinuous lines, having interposed therebetween continuous projecting segments 7; these segments 7 may be of the same length or may be shorter, as shown in FIG. 4; preferably, they are located symmetrically with respect to the break point of the main, elongated projections.

Figure 5:
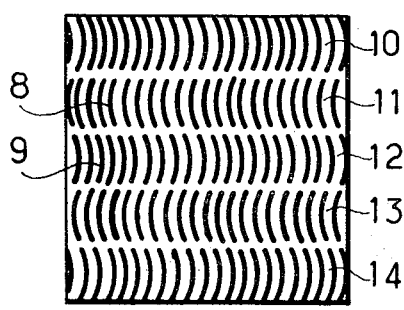
FIGS. 5 and 6 are views similar to FIGS. 1 to 4, in which the projections are curved and form arcs of a circle.

Embodiment of FIG. 5: The arrays of projections are formed as segments of arcs of a circle, pointing in opposite directions; one arc is concave to the right, as seen at projections 8, and the adjacent projections 9 will then be concave to the left. Five networks 10–14 are illustrated.

Figure 6:
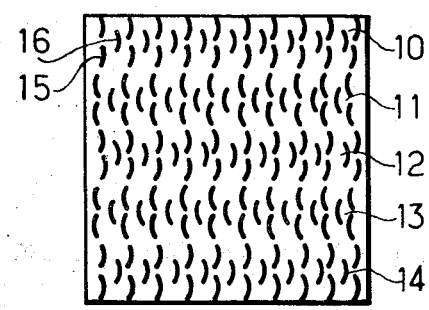

Embodiment of FIG. 6: Five rows 10–14 of projections are each formed by alternate placement of continuous double projections 15 and single projection 16, within any one row. This arrangement is the circular equivalent, in effect, of the arrangement illustrated in FIG. 4.

Figure 7:
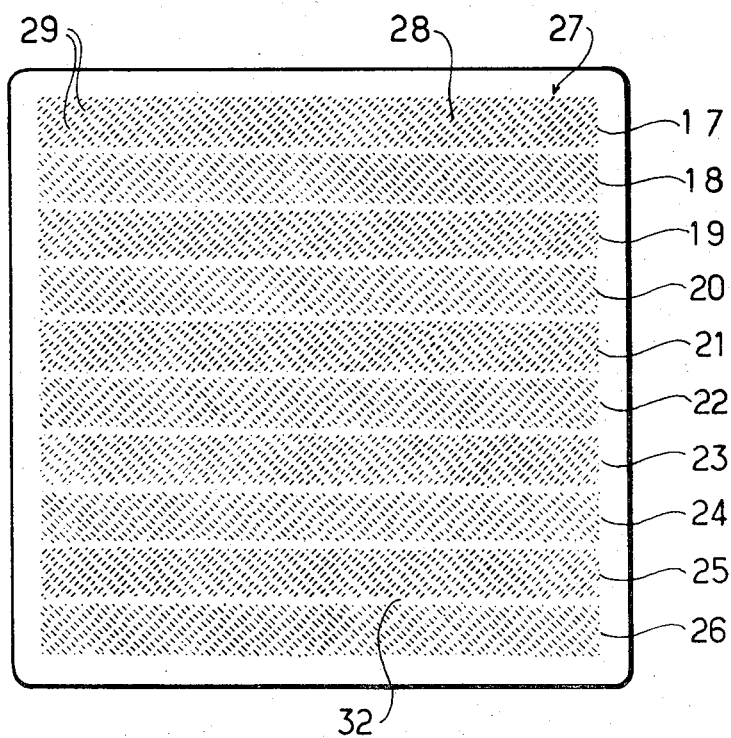
FIG. 7 is a schematic plan view of an electrode in which the projections are in chevron arrangement.

FIGS. 1–6 illustrate possible arrangements; many variations are possible. For example, a flat margin may be formed all the way around the electrode, as illustrated in FIG. 7, and various different types of arrays of projections may be combined on a single electrode. Projections may be continuous, or may be in the form of individual peaks, which themselves are similar or different, and forming conjointly the groups of the arrays 2–5 (FIG. 1) or 10–14 (FIGS. 5, 6). The shape of the outer projections may differ from those within the projections of an array, to direct and assist in distribution of electrolyte flow.

Figure 8:
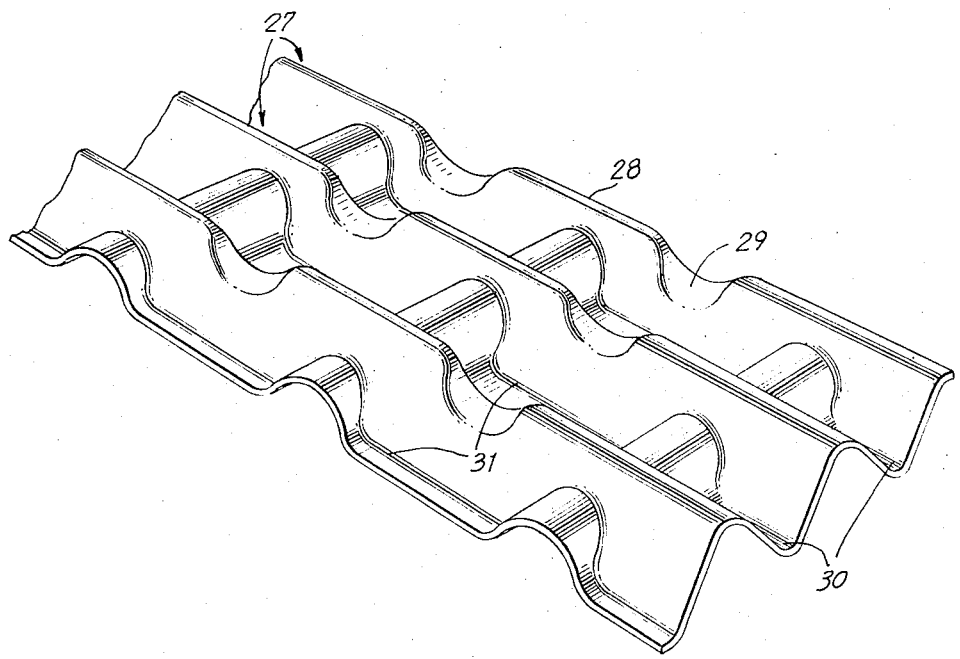
FIG. 8 is a greatly enlarged perspective view of an electrode and illustrating the projections and depressions.

FIG. 7 illustrates a preferred form of an electrode structure, in which the marginal portions, or frame, if provided, having the fluid ducts, are omitted. Reference may be had, for example, to the aforementioned patents, and applications, for a complete illustration thereof. The electrode structure of FIG. 7 is sub-divided into groups 17–26, forming parallel bands extending from one side of a square structure to the other. Each one of these bands carry arrays 27 of small straight elongated segments 28. Segments 28 are all of the same length, inclined 45 degrees with respect to the edge of the electrode, and the direction of inclination of the segments within one group changing with respect to the direction of inclination of a subsequent group, so that the individual elements of two groups will, between each other, form an angle of 90 degrees with respect to the projections of adjacent bands. These projections, therefore, together form a chevron design, with the chevrons being arranged parallel among themselves. The straight segments of the various arrays have aligned ends, as shown at 29, with respect to a direction perpendicular to the groups themselves. Only the projections 28 have been shown in FIG. 7. The same face 7 is, with respect to its median plane as represented, for example, by the marginal portions which do not carry projections, formed with depressions which on, the other side of the face, will then form projections. FIG. 8 illustrates the arrangement in greatly enlarged scale and in detail. The projection 28, on one side, is located adjacent a depression 30; the depression 30, when looked at from the other face, will there form a projection—with reference to a median plane of the electrode. Projections and depressions are offset with respect to each other. The direction of the arrays 27 of the projections 28, and of the depressions 30, 31 (FIG. 8) will correspond to one of the odd-numbered groups 17 to 25; alternate, even-numbered groups 18 to 26 will have the direction of the projections and depressions turned 90 degrees with respect to those of the odd-numbered groups, as seen in FIG. 7.

A suitable size for an electrode structure, in one form, has been found to be approximately 11 cm. square, with a flat marginal portion of 0.5 cm., to present a surface divided into six parallel groups, 10 cm. long, and somewhat over 1 cm. wide. The small projections themselves will have a length in the order of 1 mm., the spacing between adjacent projections being about of the same order. Two successive groups, such as groups 17, 18, can be spaced from each other by a gap 32 in the order of a millimeter, or several millimeters; alternatively, no such intermediate space between groups is necessary. The thickness of the sheet itself may be several tens of microns, and the extent of projection, or depression from a median plane of projections 28 and depressions 30 may be several tenths of a millimeter. If the discontinuous line of projection is used, as illustrated in FIG. 8, the intermediate gaps will be approximately within the median plane of the electrode, and have a position approximately even with the un-embossed margins, as seen in FIG. 7.

It has been found that an electrode such as that illustrated in FIG. 7, or FIG. 8, can be particularly well utilized with an electrolyte formed as a pure liquid, as well as with electrolytes which provide for emulsions of gas in liquids, and that an electrode surface as described will have the feature of a slip layer surface, as previously described.

Various changes and modifications may be made within the inventive concept. The projections may, for example, be in peak form as illustrated in U.S. application Ser. No. 123,110, particularly FIGS. 1 and 2, the disclosure of which is incorporated by reference.

What is claimed is:

1. Fuel cell comprising an assembly of stacked non-porous bi-polar electrodes alternating with semi-permeable diaphragms, said electrodes and diaphragms being in the form of thin sheets having opposed marginal portions formed with duct means enabling flow of mixed electrolyte and reactants lengthwise of the stack and to supply mixed electrolyte and reactant to all the electrodes electrolyte being supplied to the electrodes flowing and washing over the faces of the electrodes from one of said opposed marginal positions to the other, the faces of said electrodes being formed with projections on at least one side thereof; characterized in that the projections formed on the faces of the electrodes are arranged in a plurality of alternate groups, each group, in itself, parallel to said marginal portions of the electrodes between which flow of mixed electrolyte and reactant is directed to wash over the face thereof;

and further characterized in that the individual projections within each group comprise an array of elongated ridges parallel to each other and inclined with respect to said marginal portions;

the angle of inclination of adjacent groups being approximately equal, and the direction of inclination of the ridges in adjacent groups being in alternating direction, to provide an average direction of flow between said marginal portions containing said duct means which is approximately perpendicular to said marginal portions between which mixed electrolyte and reactant washes over the face of individual electrodes.

2. Fuel cell according to claim 1, wherein the electrodes are embossed sheet material and the projections on one face alternate with adjacent depressions, offset with respect to the projections;

the projections and depressions on one face forming the depressions and projections on the other face of the electrode.

3. Fuel cell according to claim 1, wherein said electrodes are of metallic material, semi-conductive material or conductive plastic material.

4. Fuel cell according to claim 1, wherein said electrodes are provided with a layer of a catalyst.

5. Fuel cell according to claim 1, wherein said projections are corrugation lines.

6. Fuel cell according to claim 1, wherein said projections are groups of successive peaked points.

7. Fuel cell according to claim 1, wherein said electrodes are of a thickness of several tens of microns.

8. Fuel cell according to claim 1, wherein the projections of each electrode project from a median plane of the electrodes by several tenths of a millimeter.

9. Fuel cell according to claim 2, wherein the extent of the depression and extent of the projection, departing from a median plane of the electrodes is approximately equal.

10. Fuel cell according to claim 1, wherein each of the groups is of rectangular outline, with the parallel ridges in adjacent groups being symmetrical with respect to a line perpendicular to said marginal portions of the electrode between which electrolyte circulates to wash over the face of the electrodes; and wherein said angle of inclination to a line perpendicular to said marginal portions is up to 45°.

11. Fuel cell according to claim 10, wherein the inclination of the parallel ridges with respect to the marginal portions is approximately 45 degrees.

12. Fuel cell according to claim 10, wherein the projections are elongated ridge lines approximately one millimeter long, the groups being spaced from each other by a distance in the order of a millimeter, and each group having a width in the order of a centimeter.

13. Fuel cell according to claim 1, wherein the elongated ridges forming the projections are continuous.

14. Fuel cell according to claim 1, wherein the elongated ridges forming the projections are discontinuous.

15. Fuel cell according to claim 1, wherein the elongated ridges forming the projections are straight.

16. Fuel cell according to claim 1, wherein the elongated ridges forming the projections are curved.

17. Bi-polar electrode structure comprising a thin sheet of embossed, corrugated non-porous material having projections formed on one face and forming depressions on the other face, said sheet having opposed marginal proportions on two opposed sides of at least one face formed with duct means adapted to enable liquid to flow across the face of said structure from one of said opposed marginal portions to the other, said electrode structure being characterized in that the projections formed on the faces of said electrode are arranged in a plurality of alternate groups, each group, in itself, parallel to said marginal portions of the electrode;

and further characterized in that the individual projections within each group comprise an array of elongated ridges parallel to each other and inclined at an angle up to 45° with respect to a line perpendicular to said marginal portions;

the angle of inclination of adjacent groups being approximately equal, and the direction of inclination of the ridges in adjacent groups being in alternating direction, to provide an average direction of flow between said marginal portions which is approximately perpendicular to said marginal portions.

18. Electrode structure according to claim 17, wherein the electrodes are sheet material of several tens of microns in thickness, and the depressions and projections are of approximately equal height and depth, respectively, and extend from a median plane of the electrode by a distance of several tenths of a millimeter.

19. Electrode structure according to claim 17, wherein said electrode is of a thickness of several tens of microns.

20. Electrode structure according to claim 17, wherein the projections of each electrode project from a median plane of the electrode by several tenths of a millimeter.

21. Electrode structure according to claim 17, wherein each of the groups is of rectangular outline, with the parallel ridges in adjacent groups being symmetrical with respect to a line parallel to the said marginal portions of the electrode.

22. Electrode structure according to claim 18, wherein each of the groups is of rectangular outline, with the parallel ridges in adjacent groups being symmetrical with respect to a line parallel to the said marginal portions of the electrode.

23. Fuel cell according to claim 10, wherein the electrodes are embossed sheet material and the projections on one face alternate with adjacent depressions, offset with respect to the projections;

the projections and depressions on one face forming the depressions and projections on the other face of the electrode.

24. Fuel cell according to claim 23, wherein the extent of the depression and the extent of the projection, departing from a median plane of the electrodes is approximately equal.

25. Fuel cell according to claim 24, wherein said electrodes are of a thickness of several tens of microns and wherein the projections of each electrode project from a median plane of the electrode by several tenths of a millimeter.

References Cited
UNITED STATES PATENTS

| | | | |
|---|---|---|---|
| 686,886 | 11/1901 | Chamberlain | 136—145 |
| 2,887,456 | 5/1959 | Halford et al. | 136—86 D |
| 3,432,357 | 3/1969 | Dankese | 136—86 R |
| 3,442,715 | 5/1969 | Yee et al. | 136—86 D |
| 3,515,596 | 6/1970 | Doll et al. | 136—86 D |
| 3,589,942 | 6/1971 | Leitz et al. | 136—86 D |

ALLEN B. CURTIS, Primary Examiner

H. A. FEELEY, Assistant Examiner